United States Patent [19]

Rocca et al.

[11] Patent Number: 4,866,448
[45] Date of Patent: Sep. 12, 1989

[54] SIGNAL PROCESSOR FOR SYNTHETIC APERTURE RADAR, PARTICULARLY FOR PARALLEL COMPUTATION

[75] Inventors: Fabio Rocca, Milan; Ciro Cafforio, Grottaglie-Taranto; Claudio Prati, Milan, all of Italy

[73] Assignee: Selenia, Industrie Elettroniche Associate S.p.A., Rome, Italy

[21] Appl. No.: 945,338

[22] Filed: Dec. 22, 1986

[30] Foreign Application Priority Data

Dec. 24, 1985 [IT] Italy .................... 48983 A/85

[51] Int. Cl.⁴ .................................. G01S 7/30
[52] U.S. Cl. ............................ 342/25; 367/88
[58] Field of Search ..................... 342/25; 367/88

[56] References Cited

U.S. PATENT DOCUMENTS

| | | | |
|---|---|---|---|
| 3,228,028 | 1/1966 | Baum et al. | 342/25 |
| 4,086,590 | 4/1978 | Goggins, Jr. | 342/25 |
| 4,132,989 | 1/1979 | Arens | 342/25 |
| 4,219,811 | 8/1980 | Herman et al. | 342/25 |
| 4,283,767 | 8/1981 | Rountree | 364/574 |

OTHER PUBLICATIONS

Skolnik, Merril; "Introduction to Radar Systems"; McGraw-Hill Book Co.; pp. 517-529; 1980.
D. A. Ausherman, A. Kozma, J. L. Walker, H. M. Jones, E. C. Poggio "Development in Radar Imaging", IEEE Transactions on Aerospace and Electronic Systems, vol. AES-20, No. 4, Jul. 1984.
M. Dack, M. R. Ito, I. G. Cumming "Application of Efficient Linear FM Matched Filtering Algorithms to Synthetic Aperture Radar Processing", IEE Proceedings, vol. 132, Pt. F. No. 1, Feb. 1985.
K. H. Wu, M. R. Vant "Extensions to the Step Transform SAR Processing Technique", IEEE Transactions on Aerospace and Electronic Systems, vol. AES-21. No. 3, May 1985.

Primary Examiner—Thomas H. Tarcza
Assistant Examiner—Tod Swann
Attorney, Agent, or Firm—Herbert Dubno

[57] ABSTRACT

This invention concerns a synthetic aperture radar system within which focussing processing is achieved through the use of filter banks, based upon undersampling and polyphase networks. The focussing operation consists of the correlation of the datum with system response to a point scatterer.

2 Claims, 1 Drawing Sheet $f_i - f_{i-1} = \text{CONSTANT}$

SIGNAL PROCESSOR FOR SYNTHETIC APERTURE RADAR, PARTICULARLY FOR PARALLEL COMPUTATION

FIELD OF THE INVENTION

The present invention relates to a synthetic aperture radar system within which focussing is achieved through the use of filter banks, based upon undersampling and polyphase networks.

The radar echo, in its in-phase and quadrature components, is split into N complex signals through bank of N adjacent band pass filters. These signals are shifted to band base and undersampled.

Operating in parallel, it is possible to correlate each of these signals with the corresponding reference signal.

This can be achieved, in turn, in a simple and adaptive manner, based upon data related to the relative movement between sensor and target. The different correlator outputs provide focussed images, but have poor resolution. Such signals can be combined to provide an image having the maximum possible resolution by a technique similar to that used for its splitting.

It is to be appreciated that low resolution images may be combined so as to obtain images of higher resolution, yet with a resolution less than the maximum possible, so that through power addition, a better signal to noise ratio is achieved at the cost of a very limited additional implementation effort.

The advantages above are such as to justify the adoption of a similar structure, which is not limited to azimuth focussing, but can extend to radial pulse compression which has, until now, been achieved through analog techniques.

BACKGROUND OF THE INVENTION

Focussing of SAR (Synthetic Aperture Radar) images is generally made, at first, in the radial direction (pulse compression) by analog techniques and later in the azimuth direction using digital techniques or using optical techniques. Digital techniques are preferable because of their flexibility.

Focussing consists in the datum correlation with system response to a point scatterer. This is approximately made up of a linearly frequency modulated sinus wave.

It is to be appreciated that the frequency modulation isn't perfectly linear, and that the pulse response is not localized at constant reflection time, due to the radial migration effect (D. A. Ausharman, A Kosmo, H. M. Jones, E. Poggio. "Development in Radar Imaging" IEE Trans. on Aerospace and Electr. Systems AES-20, n. 4, July 1984). Image focussing requires therefore the convolution of bidimensional matrix data (azimuth and range) using a bidimensional filter, the pulse response of which may extend, in the case of satellite sensors, to up to a thousand samples.

A technique which can be used is that of bidimensional numeric convolution by means of a filter having finite length pulse response, possibly implemented using discrete Fast Fourier Transforms. The drawback is that this technique is not at all flexible and it does not lend itself either to echo radial migration correction, or to system parameter variation due to sensor motion irregularities.

The foremost technique known today uses the step transform with respect over which the technique of this invention is a net improvement (M. Dack, M. R. Ito, I. G. Cunning. "Application of Efficient linear F.M. Matched Fellenng Algorithmsto Synthetic Aperture Radar Processing" IEE Proc. Vol. 13297, No. 1, February 1985).

The step transform technique consists in the conversion of the incoming signal, radially compressed into a frequency chirp having limited time duration T, repeated in time.

If the slope of such chirp is equal but opposite to that of the incoming signal, this is transformed by a constant frequency chirp, into a sequence of sinusoidal signals at piecemeal constant frequency (staircase).

This signal is examined spectrally using techniques which are based upon discrete Fourier transforms.

The amplitude and frequency progression lead to the location of the single scatterer and to an estimate of its reflection coefficient.

This technique, in a rather simple manner, as a first approximation, takes into account both radial migration and small linearity deviations of the frequency modulation law (K. H. Wu, M. R. Vant-"Extension to the Step Transform SAR Processing Technique" IEE Trans. Aerospace an Aerospace and Electr. System, Vol. AES-21 No. 3, May 1985). At any rate, the main drawback which affects this technique is its block structure, which impedes easy adaption.

Furthermore, precise linear F.M. deviation correction isn't possible without reducing the processing advantages which would be obtained otherwise. The technique of radar echo splitting into band limited signals with adjacent bands is known, but is rarely adopted due to its high computing costs when implemented using traditional techniques.

Polyphase networks for signal splitting are known, but have never been applied to synthetic aperture radars.

BRIEF DESCRIPTION OF THE INVENTION

The present invention will now be described with reference to one of its presently preferred implementations, with reference to the accompanying drawing in which.

DESCRIPTION

Figure 1:
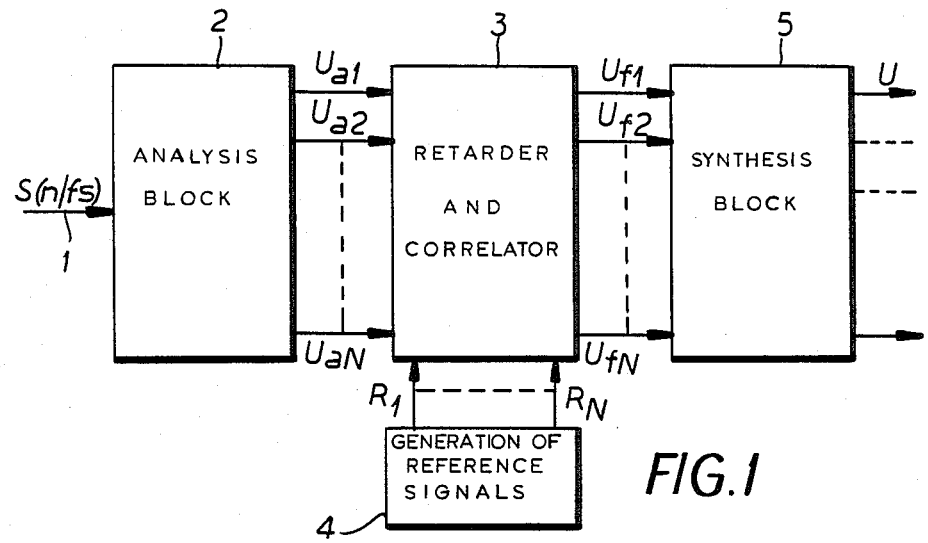
FIG. 1 is a block diagram of the circuit of the invention.

With reference to the drawing, the circuit presented in this invention, implements radar echo focussing in three successive steps using the circuit shown in FIG. 1.

Figure 2:
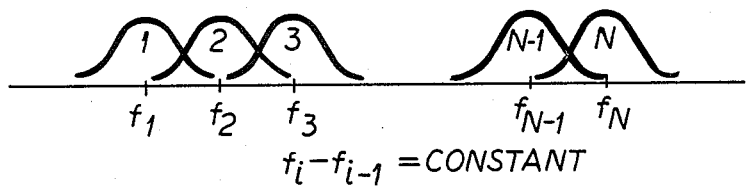
FIG. 2 is a waveform diagram which shows the shape of the filter bank response, which is useful to explain the functioning of the structure of FIG. 1.

The complex radar echo 1 (containing in phase and in quadrature components) sampled at frequency fS, is sent to an analysis block 2, which performs the following: filtering of signal 1 through N band pass filters with identical transfer function, but centered around equispaced frequencies fi (see FIG. 2); base band translation of each filter output, so that the center frequency of the pass band (fi) corresponds to zero frequency; and undersampling of each signal after base band translation. Thus the N $U_{ai}$ complex signals sampled at a frequency fS/N are obtained at the output of the analysis block 2. These signals are sent to the block 3 where each signal $U_{ai}$ is delayed by a suitable number of sampling steps, correlated with a reference signal Ri, related to the corresponding frequency band. Reference signals Ri are obtained at block 4, conceptually, by carrying out the same set of operation as block 2, on a signal which represents the response of the radar signal to a point scatterer. Reference Ri can be obtained by beating such response to a point scatterer with an exp complex sinusoidal waveform (j2 fit) at zero frequency, with bandpass similar to that of the filters contained in block 2. Such references can be easily computed once the sensor target motion is known.

Outputs $U_{fi}$ are already focussed signals, but with limited resolution, 1/N times the theoretical maximum possible.

Block 5 combines the focussed signals at low resolution at output of block 3 so that only one signal at full geometric resolution, or M signals at M times lesser resolution than the maximum theoretical resolution, are obtained. It is therefore possible to obtain a full range of geometric resolutions, which stretch from the maximum obtainable from the system up to that of the single signal at block 3 output.

Block 5 carries out the inverse operation to that of block 2, lining up in frequency the outputs of contiguous channels till the desired resolution is obtained.

It is to be noted that in the case a geometrical resolution M times lesser that the maximum is required, M signals, obtained focussing the radar echo on different frequency bands, are available. By carrying out a non coherent sum (sum of complex signal modules) we can improve the signal to noise ratio of the total output by a factor close to M.

The qualifying aspect of the circuit of the invention is that the analysis operations in block 2 (therefore, with inverse procedure, also those of synthesis in block 5) immediately perform an undersampling of the radar echo without first undergoing numerical filtering.

The innovation is in the application of such techniques to the processing of radar signals.

Figure 3:
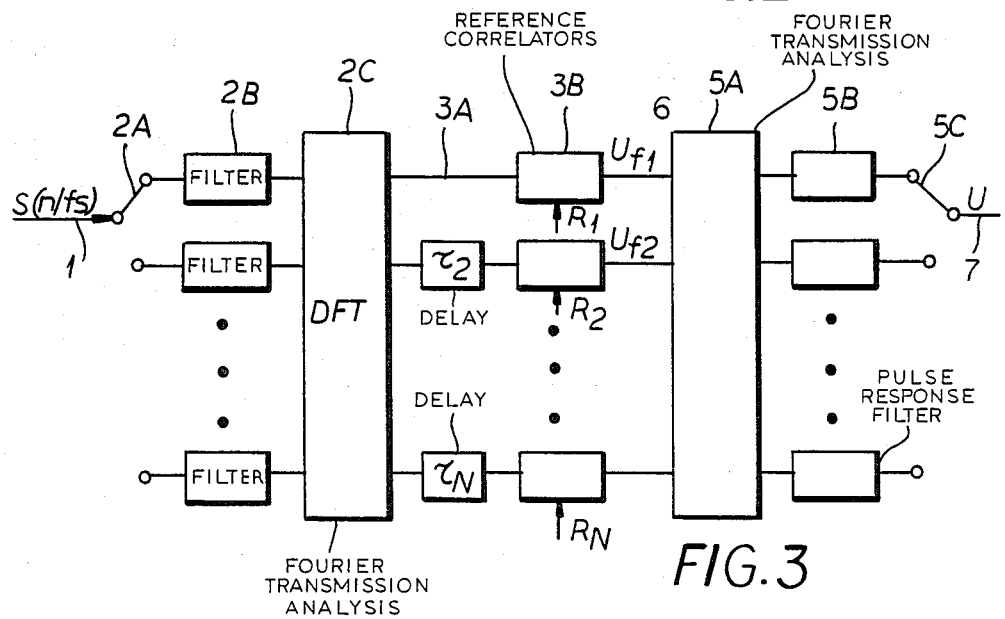
FIG. 3 is a block diagram which shows in greater detail the structure of the circuit layout in accordance with the invention.

With reference to FIG. 3, we can see that the circuit schematic is such that the complex radar echo (containing in phase and quadrature components) sampled and quantized at, 1, is sent to a switch 2A which sorts out the complex samples at the input toward the N numeric filters having finite pulse response of bank 2B.

The N outputs of these filters are the inputs to block 2C where they are combined so that the N block outputs are the discrete Fourier transforms of the inputs.

The signals at the input to the different filters of bank 2C are therefore made up of complex signal 1, which is gradually time shifted by a sampling step and undersampled by a factor N. The responses to the discrete impulse of the N filters are obtained starting from the response to the discrete pulse with a number of coefficients equal to a multiple of N of a generating filter having a transfer function of the low pass type with a cutoff frequency fS/2N.

The process through which we get the filter coefficients still consists of time translations and undersampling by a factor N. Obtained this way, the outputs of block 2C correspond exactly to those suggested for block 2 of FIG. 1—(M. Bellanger—"Digital Processing of Signals: theory and Practise Wiley)—(P. Crochiere and L. Robiner "Multirate Digital Signal Processing Prentice Hall").

To develop a bank of partially overlapping filters, we shall have no insert a zero between two successive samples sent to each filter and its pulse response can be obtained from that of the generating filter by undersampling at an N/2 rate.

The outputs of block 2C are therefore signal 1 filtered by one of the filters of the bank at FIG. 1 converted to base band and undersampled. A battery of correlators 3B correlates each of these signals with the suitable reference signal. Each of these reference signals consists of the total reference (system response in presence of a point scatterer) pass band filtered with a filter which has a band equal to that of the filter with which we have obtained the signal to correlate against the reference in subject.

The different reference signals will be different from zero only due to the limited number of samples, but they will be mutually delayed. Delays 3A compensate for such delays, limiting to the minimum the length of the correlation. Outputs 6, which are the result of the N correlations, provide N focussed signals having resolution which is N times lesser than the maximum possible (sub-look). The various sub-looks can be combined coherently using a structure similar to that used for analysis, and this is made up of:

block 5A which calculates the discrete Fourier transform of the N signals 6;

finite pulse response filters 5B; and switch 5C which scans the N outputs from the filters obtaining a sampling signal fS equal to that of the input signal.

In this way we obtain a signal which is focussed with the maximum space resolution possible.

However we may also obtain a full range of intermediate reductions through slight modifications to the synthesis structure.

It suffices to make block 5A calculate M discrete Fourier transforms on a number N/M of consecutive outputs 6.

The filters remain the same, but the delays must be modified. In this way we have M signals having a resolution which is M times lesser than the theoretical maximum.

Processing gain

Processing gain is due to the fact that references $R_i$, as well as having a narrower band than the overall reference and therefore sampled at a lower frequency, also have a shorter duration. This is such that each single reference signal is made up of a non-nil number of samples which is considerably lower (up to N 2 times lower, in theory) than required to describe the overall reference.

Correction of the radial migration

Radial migration can be compensated by combining the output of analog channels of different range bins with suitable weights which differ from channel to channel.

Channels are those consisting of each of the bank filters shown in FIG. 1 and successive operations performed on the related filtered signal.

Uniqueness

The qualifying aspects of the whole system are its simplicity and complete adaptability to variations and difformities of the frequency modulation law of the radar echo.

Such adaptability can be achieved with the maximum circulation of parameters, making the presented invention's circuit layout particularly suitable for large scale integration implementation technology.

We claim:

1. A method of focussing in a synthetic aperture radar system, comprising the steps of:
   (a) transmitting a radar signal to a target and recovering a radar echo with complex in-phase and quadrature components;
   (b) sampling said complex radar echo at a frequency $f_S$;
   (c) filtering the sampled complex radar echo through N bandpass filters with identical transfer functions and centered around equispaced center frequencies $f_i$ to obtain an output from each filter;
   (d) effecting base-band translation of each filter output so that the center frequency $f_i$ of the respective pass band corresponds to zero frequency;
   (e) undersampling each signal resulting form the base-band translation to yield N complex signals $U_{ai}$ sampled at $f_S/N$;
   (f) delaying each of the signals $U_{ai}$ by a number of sampling steps correlated with a respective reference signal $R_i$ related to the corresponding frequency band to yield focussed signals $U_{f1}$ through $U_{fN}$ of limited resolution individually, and deriving said respective reference signals by base-band translation and undersampling of a signal representing a system response of the radar signal to a point scatterer and pass band filtered with a filter having a pass band corresponding to that of the filter producing the respective signal $U_{ai}$; and
   (g) additively combining the signals $U_{f1}$ through $U_{fN}$ into M groups of signals where M<N, to yield at least one signal of a resolution 1/M times a theoretical maximum resolution, said reference signals being derived in step (f) by beating the response of the radar signal to a point scatterer with an exp complex sinusoidal waveform with a j2 fit at zero frequency and subjecting the beat signals to filtering and base-band translation to yield the respective signals $R_i$.

2. A focussing system in a synthetic aperture radar in which a radar signal is transmitted to a target and a radar echo with complex in-phase and quadrature components is recovered from the target, said system comprising:
   means for sampling said complex radar echo at a frequency $f_S$;
   filter means connected to said means for sampling for filtering the sampled complex radar echo through N bandpass filters with identical transfer functions and centered around equispaced center frequencies $f_i$ to obtain an output from each filter;
   means, connected to said filter means, for effecting base-band translation of each filter output so that the center frequency $f_i$ of the respective pass band corresponds to zero frequency;
   means for undersampling each signal resulting from the base-band translation to yield N complex signals $U_{ai}$ sampled at $f_S/N$;
   means, connected to said means for undersampling, for delaying each of the signals $U_{ai}$ by a number of sampling steps correlated with a respective reference signal $R_i$ related to the corresponding frequency band to yield focussed signals $U_{f1}$ through $U_{fN}$ of limited resolution individually, and deriving said respective reference signals by base-band translation and undersampling of a signal representing a system response of the radar signal to a point scatterer and pass band filtered with a filter having a pass band corresponding to that of the filter producing the respective signal $U_{ai}$;
   means for additively combining the signals $U_{f1}$ through $U_{fN}$ into M groups of signals where M<N, to yield at least one signal of a resolution 1/M times a theoretical maximum resolution; and
   means for controlling delay times of at least said signals $U_{ai}$.

* * * * *